(12) United States Patent
Rho (10) Patent No.: US 7,618,003 B2
(45) Date of Patent: Nov. 17, 2009

(54) BAITCAST REEL HAVING EXTERNALLY ADJUSTABLE DUAL BRAKES HAVING CENTRIFUGAL AND MAGNETIC BRAKES

(75) Inventor: Yeon Seok Rho, Seoul (KR)

(73) Assignee: Dawon Eng. Co., Ltd., Incheon-Si (KR)

( * ) Notice: Subject to any disclaimer, the term of this patent is extended or adjusted under 35 U.S.C. 154(b) by 107 days.

(21) Appl. No.: 11/912,706

(22) PCT Filed: Apr. 20, 2006

(86) PCT No.: PCT/KR2006/001475

§ 371 (c)(1),
(2), (4) Date: Oct. 26, 2007

(87) PCT Pub. No.: WO2006/115351

PCT Pub. Date: Nov. 2, 2006

(65) Prior Publication Data

US 2008/0257997 A1 Oct. 23, 2008

(30) Foreign Application Priority Data

Apr. 28, 2005 (KR) ...................... 10-2005-0035327

(51) Int. Cl.
*A01K 89/01* (2006.01)
(52) U.S. Cl. ................... 242/288; 242/289; 188/181 A
(58) Field of Classification Search ................ 242/288, 242/289; 188/181 A, 185
See application file for complete search history.

(56) References Cited

U.S. PATENT DOCUMENTS

| | | | | |
|---|---|---|---|---|
| 4,830,308 A | * | 5/1989 | Puryear | 242/288 |
| 5,308,021 A | * | 5/1994 | Ikuta | 242/289 |
| 5,996,921 A | | 12/1999 | Hogaki et al. | |
| 6,012,666 A | | 1/2000 | Hogaki et al. | |
| 6,126,105 A | | 10/2000 | Yamaguchi | |
| 6,371,396 B1 | * | 4/2002 | Kawasaki | 242/289 |
| 6,481,657 B1 | * | 11/2002 | Oishi et al. | 242/289 |
| 6,955,315 B2 | | 10/2005 | Hyun | |
| 6,959,886 B1 | * | 11/2005 | Rho | 242/289 |
| 6,964,387 B2 | | 11/2005 | Hyun | |

\* cited by examiner

*Primary Examiner*—Emmanuel M Marcelo
(74) *Attorney, Agent, or Firm*—Brooks Kushman P.C.

(57) ABSTRACT

A baitcast reel includes a spool having a spool shaft rotatably connected to the reel, a centrifugal brake including a shoe housing connected to the spool shaft, rotated together with the spool, and having a plurality of brake shoes slidably inserted in grooves radially formed, a brake drum accommodating the shoe housing and the guide plate, and having a plurality of brake stages frictionally contacting the brake shoes for selectively restricting rotation of the brake housing, and a knob rotatably coupled to the brake housing for moving the brake drum moving portion back and forth, and a magnetic brake including a dial positioned coaxially with the knob and being flush with a side of a main cover, and a magnet holder having magnets moved back and forth along a rotating shaft by a cam surface of the dial. When the knob is rotated, the knob crosses the fixing holes, with it being resiliently biased by the resilient member, which produces the click sound, and the user feels rotation of the knob, since the rotation of the dial is restricted by the fixing holes.

7 Claims, 6 Drawing Sheets

BAITCAST REEL HAVING EXTERNALLY ADJUSTABLE DUAL BRAKES HAVING CENTRIFUGAL AND MAGNETIC BRAKES

TECHNICAL FIELD

The present invention relates to a baitcast reel, and more particularly to a brake system for a baitcast reel capable of generating two types of drag forces so as to effectively prevent spool backlash of the baitcast reel.

BACKGROUND ART

A baitcast reel is a kind of fishing tool capable of freely casting/retrieving a fishing line. The baitcast reel includes a spool positioned in a case, with a fishing line being wound around thereon, a spool drive gear mechanism for rotating the spool, a drag mechanism for slowing rotation of the spool during casting, and a level-wind mechanism for ensuring that the fishing line is properly wound around the spool during winding. The spool drive gear mechanism is driven by a handle provided to the exterior of the case or casting power to rotate the spool forwardly or reversely at a high speed.

With the construction, after a bait and a fishhook having a weight are connected to the end of a fishing line wound around the spool, a fishing rod with a baitcast reel is swung at a large angle to cast the weight and the bait, with the baitcast reel being gripped by a user's hand. At that time, the spool is rotated at a high speed by the weight, so that the fishing line is unwound from the spool.

DISCLOSURE OF INVENTION

Technical Problem

With the construction of such a baitcast reel, in case the braking of the spool rotated at a high speed is not properly controlled, after the bait has been cast at an intended spot, the spool is continuously rotated due to the inertial force of the rotating spool. Therefore, the fishing line is further unwound from the spool to result in a line backlashing. In order to alleviate the line backlashing, a user must properly hold the rotating spool with his thumb after casting to carry out a braking operation, thereby decelerating the rotational speed of the spool. Since the rotational force resulted from the inertial force is subtly changed after the casting has been completed, it is difficult for even skilled fisher to effectively brake the rotation of the spool with manual operation. Further, in case of beginners, the spool may be reversely rotated, thereby causing a line backlashing problem.

Of course, a magnetic brake mechanism is used to alleviate the line backlashing problem. The weight flies together with a bait by the maximum rotational force at an initial stage of the casting. However, as the rotational force is gradually decreased, the weight falls in motion of projectile. However, since the magnetic drag mechanism applies a constant braking force to the spool, the rotational force of the spool is decreased more than a necessary level, which shortens a casting distance.

Therefore, the present invention has been made to solve the above-mentioned problems occurring in the prior art, and an object of the present invention is to provide a brake mechanism for a baitcast reel capable of generating two types of drag forces by integrally mounting a magnetic brake and a centrifugal brake on a main cover, and capable of easily adjusting a braking force from zero to the infinite by adjusting the braking force with an external knob and dial, according to a weight of the bait, without assembling or disassembling the main cover.

Technical Solution

In order to accomplish the above-mentioned objects, there is provided a brake mechanism for a baitcast reel including a main cover, a spool having a spool shaft rotatably connected to an inside of a case, with a fishing line being wound around the spool, a spool drive gear mechanism for rotating the spool, a handle for manipulating the spool gear drive mechanism to rotate the spool, a brake for selectively restricting the rotation of the spool, and a main cover housing the brake in the case, the brake mechanism comprising a shoe housing connected to the spool shaft, rotated together with the spool, and having three pairs of first, second, and third slide grooves radially formed and biased at a specified angle with respect to a center axis thereof; six brake shoes slidably coupled to the first, second, and third slide grooves of the shoe housing; a guide plate coupled to the shoe housing for preventing the brake shoe from escaping from the first, second, and third slide grooves; a brake drum accommodating the shoe housing and the guide plate, and having first, second, and third brake stages of different inner diameters formed on an inner edge and boundary surfaces where the first, second, and third brake stages meet to each other; a brake drum moving portion coupled to the brake drum having a boss protruding from an outer surface at a slant lead angle; a brake housing fixed to the main cover, and having an opened side for receiving the brake drum moving portion and a closed side with through-holes; a spring interposed between the brake drum moving portion and the brake housing; and a knob rotatably coupled to the brake housing, and having guide bosses formed on both sides and penetrating the through-holes to move the brake drum moving portion back and forth.

Preferably, the brake drum is provided with inclined surfaces on interfaces between the first, second, and third brake stages.

Advantageous Effects

With the brake mechanism for a baitcast reel according to the present invention, after the casting has been completed, the brake shoes are outwardly moved from the slide grooves by the centrifugal force resulted from the inertia of the brake shoes, and closely contact the brake drum to brake the rotation of the spool, thereby preventing the line backlashing problem.

Also, in case in which a user having different casting power utilizes the reel, the use can increase or decrease the frictional force between the brake drum and the brake shoes by simply rotating the centrifugal brake knob to change the number of the brake shoes contacting the zero, first, second, and third brake stages, thereby effectively braking the spool, without disassembling or assembling the main cover. In order to increase the braking force of the spool, the user selectively rotates the magnetic brake or dial.

When the fishing line is wound around the spool, the brake drum is not applied with the frictional resistance by the contact stepped portion end, so that the spool can carry out the winding operation in an unloaded state.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Now, a baitcast reel according to a preferred embodiment of the present invention will be described in detail with reference to the accompanying drawings. In the following description of the present invention, the same drawing reference numerals are used for the same elements even in different drawings, and the duplicate explanation thereof will be omitted.

Figure 1:
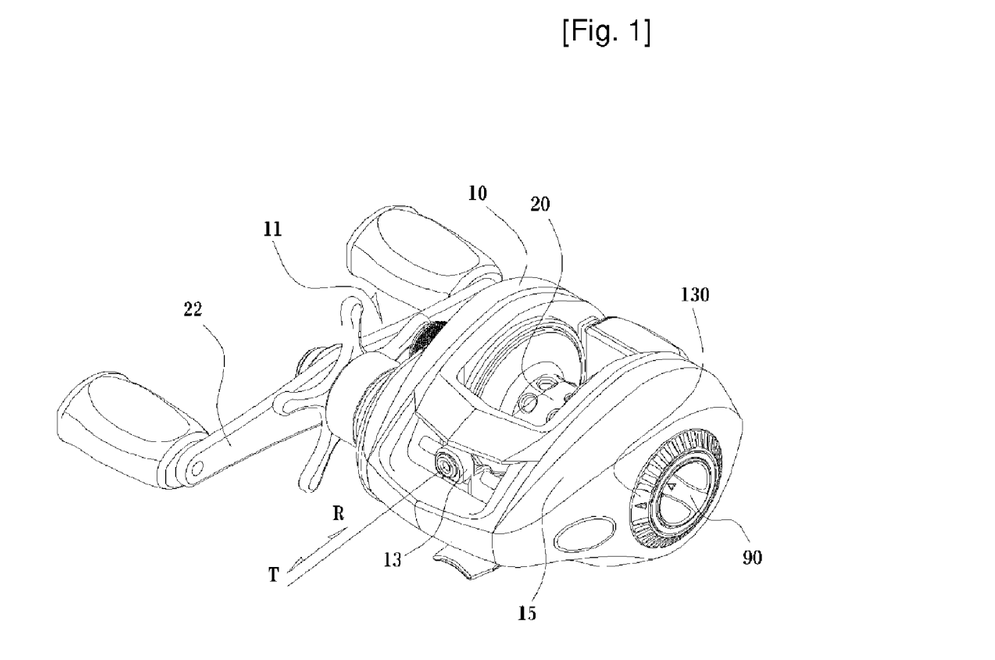
FIG. 1 is a perspective view of a baitcast reel according to the present invention.
Figure 2:
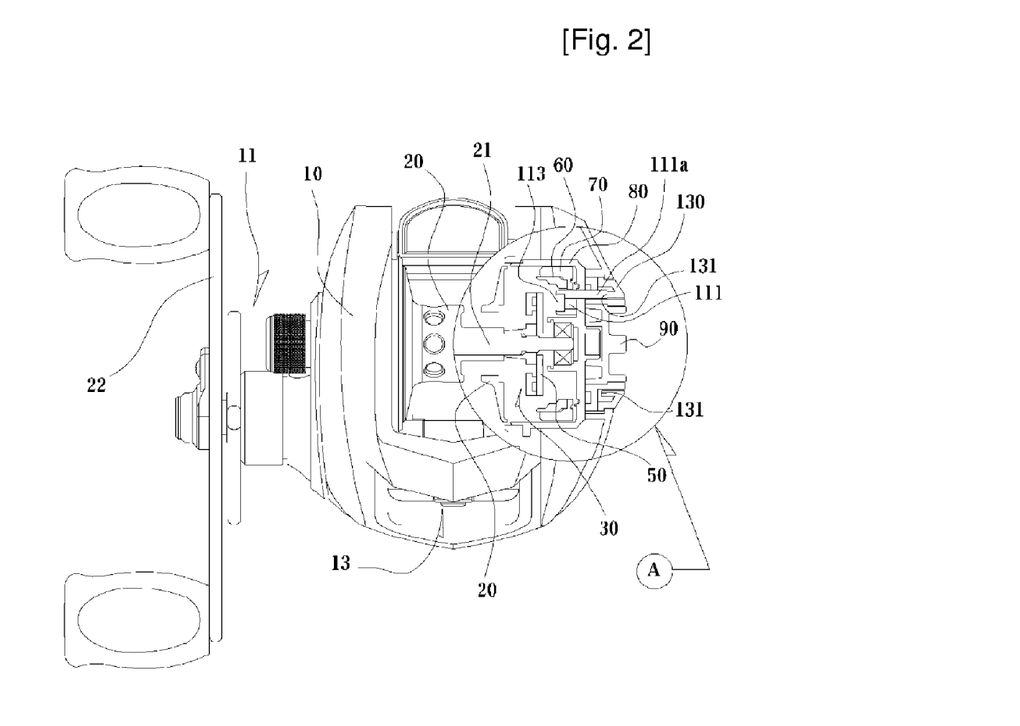
FIG. 2 is a partially schematic view illustrating a spool and a brake in the baitcast reel in FIG. 1.
Figure 3:
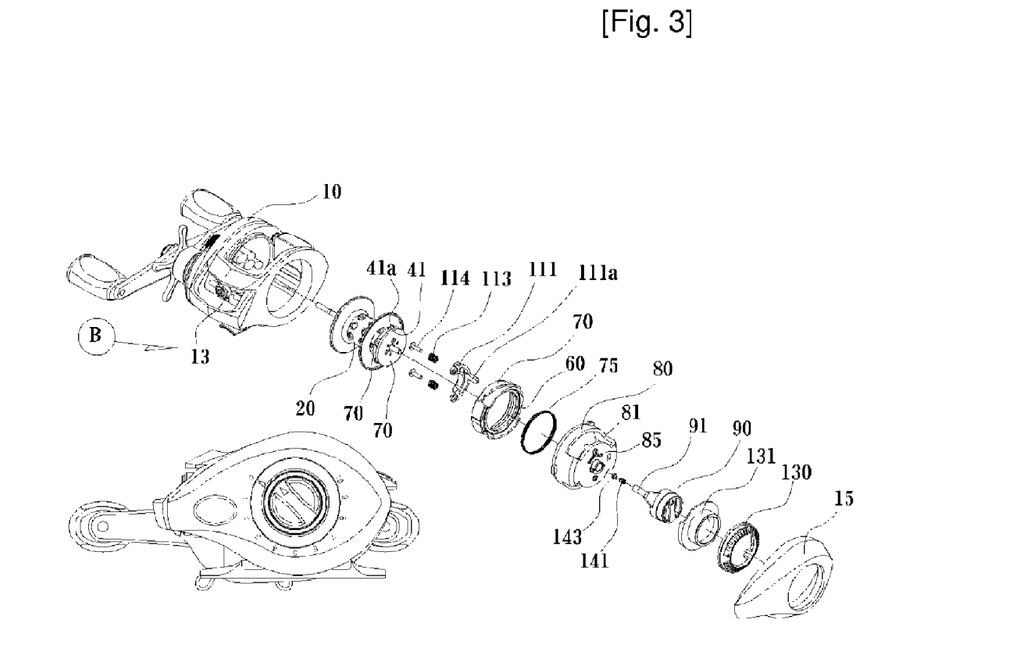
FIG. 3 is an exploded perspective view illustrating the construction of the baitcast reel in FIG. 1.
Figure 4:
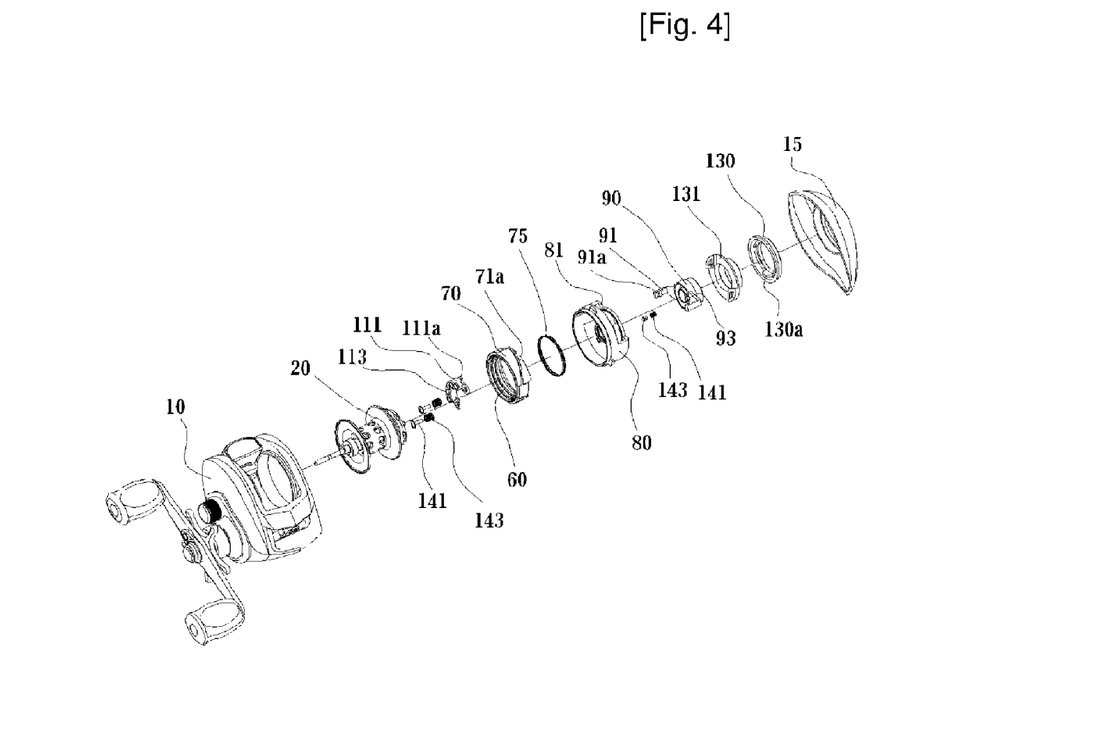
FIG. 4 is an exploded perspective view illustrating the baitcast reel when seen from a direction B in FIG. 3.
Figure 5:
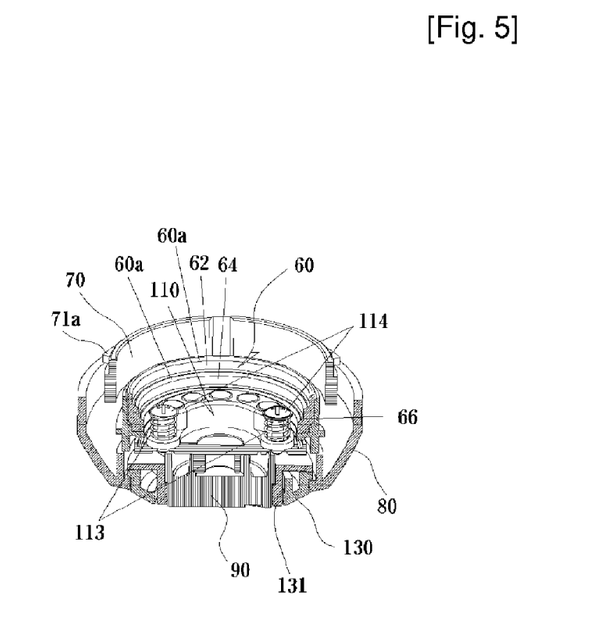
FIG. 5 is a sectional side elevation schematically illustrating the portion A in FIG. 2.
Figure 6:
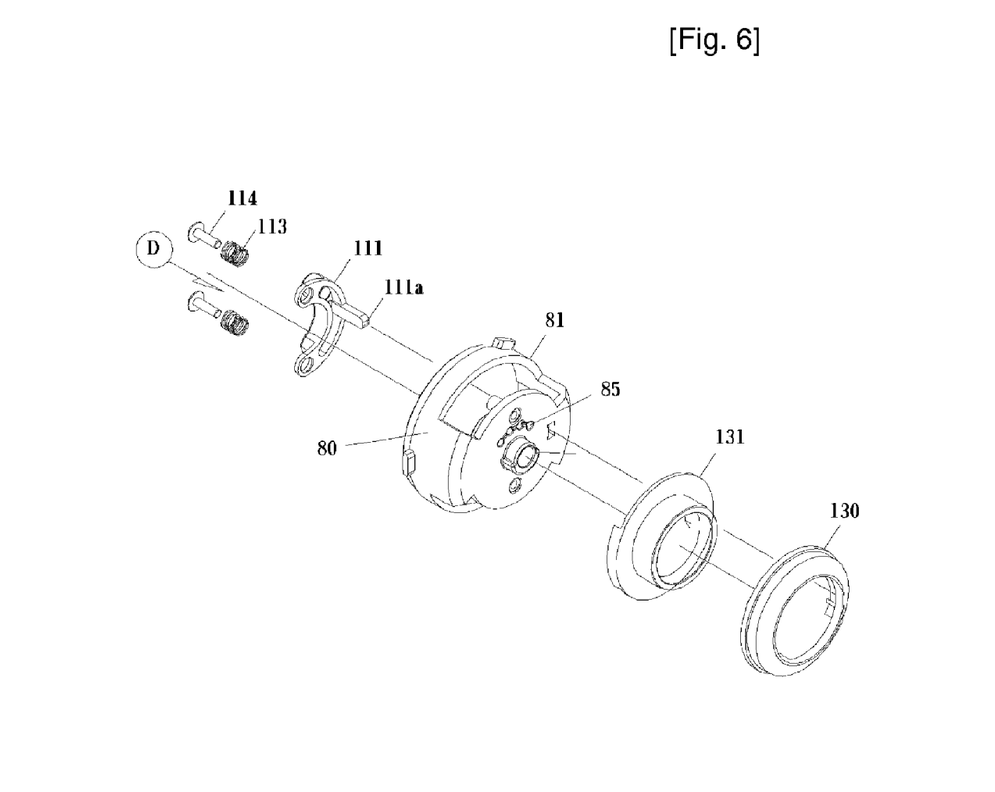
FIG. 6 is an exploded perspective view illustrating a magnetic drag mechanism and a brake drum housing of the baitcast reel in FIG. 3.
Figure 7:
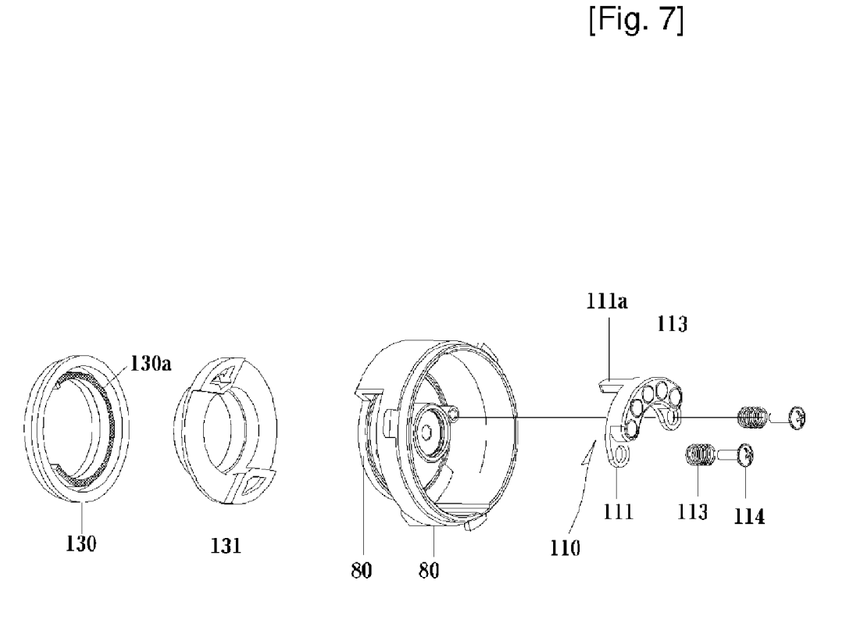
FIG. 7 is an exploded perspective view illustrating the baitcast reel when seen from a direction D in FIG. 6.
Figure 8:
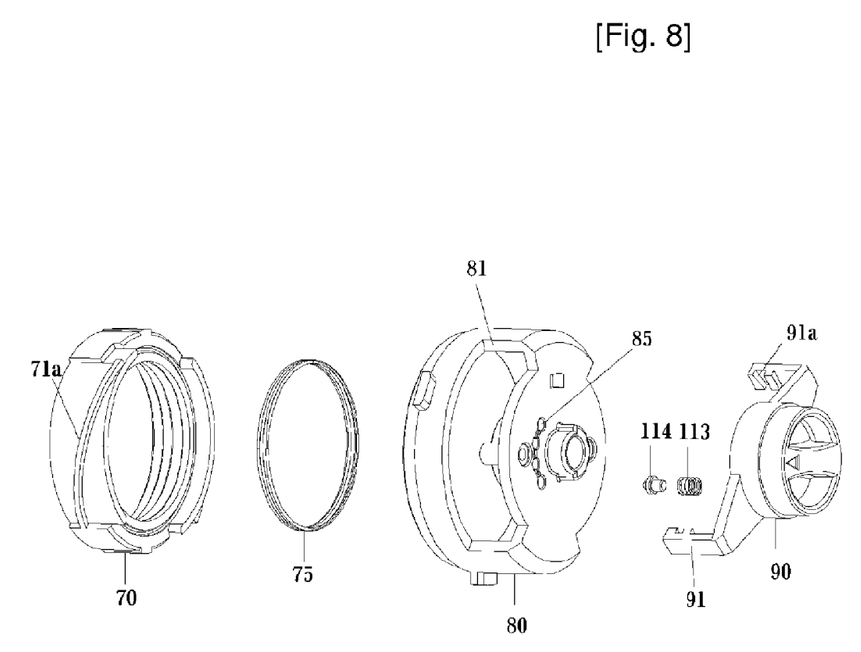
FIG. 8 is an exploded perspective view illustrating a centrifugal brake and a brake drum housing of the baitcast reel in FIG. 3.

FIG. 1 is a perspective view of a baitcast reel according to the present invention. FIG. 2 is a partially schematic view illustrating a spool and a brake in the baitcast reel in FIG. 1. FIG. 3 is an exploded perspective view illustrating the construction of the baitcast reel in FIG. 1. FIG. 4 is an exploded perspective view illustrating the baitcast reel when seen from a direction B in FIG. 3. FIG. 5 is a sectional side elevation schematically illustrating the portion A in FIG. 2. FIG. 6 is an exploded perspective view illustrating a magnetic drag mechanism and a brake drum housing of the baitcast reel in FIG. 3. FIG. 7 is an exploded perspective view illustrating the baitcast reel when seen from a direction D in FIG. 6. FIG. 8 is an exploded perspective view illustrating a centrifugal brake and a brake drum housing of the baitcast reel in FIG. 3.

As shown in the drawings, the baitcast reel according to the present invention includes a spool 20 having a spool shaft 21 rotatably connected to an inside of a case 10, with a fishing line being wound around the spool, a spool drive gear mechanism (not shown) for rotating the spool 20, a handle 22 for manipulating the spool gear drive mechanism to rotate the spool 20, a drag mechanism 11 for restricting unwinding of the fishing line, a level-wind mechanism 13 for ensuring that the fishing line is properly wound around the spool 20 during winding, a centrifugal brake 40 and a magnetic brake 110 for selectively restricting rotation of the spool 20, and a main cover 15 housing the magnetic brake 110 and the centrifugal brake 40 in the case 10. The drag mechanism 11 and the level-wind mechanism 13 are widely known in the art, and the detailed description thereof will be omitted herein.

According to one feature of the present invention, the centrifugal brake 40 includes a shoe housing 30 connected to the spool shaft 21, rotated together with the spool 20, and having three pairs of first, second, and third slide grooves 32, 34, and 36 radially formed and biased at a specified angle with respect to a center axis thereof, six brake shoes 41 slidably coupled to the first, second, and third slide grooves 32, 34, and 36 of the shoe housing 30, and a guide plate 50 coupled to the shoe housing 30 for preventing the brake shoe 41 from escaping from the first, second, and third slide grooves 32, 34, and 36.

Also, the centrifugal brake 40 includes a brake drum 60 accommodating the shoe housing 30 and the guide plate 50 and having first, second, and third brake stages 62, 64, and 66 of different inner diameter formed on an inner edge and boundary surfaces 60a where the first, second, and third brake stages 62, 64, and 66 meet to each other, a brake drum moving portion 70 coupled to the brake drum 60 having a boss 71a protruding from an outer surface at a slant lead angle, a brake housing 80 fixed to the main cover 15 and having an opened side for receiving the brake drum moving portion 70 and a closed side with through-holes 81, a spring 75 interposed between the brake drum moving portion 70 and the brake housing 80, and a knob 90 rotatably coupled to the brake housing 80 and having guide bosses 91 formed on both sides and penetrating the through-holes 81 to move the brake drum moving portion 70 back and forth. The magnetic brake 110 includes a dial 130 with a cam surface 130a, and the dial 130 has a magnet holder 111 coaxially arranged flush with the knob 90 in the brake housing 80 and moved together with the guide plate 50 of the shoe housing 30 to change the influence of a magnetic force, and a cam member 131 positioned at one side of the magnet holder 111 and contacting a following boss 111a penetrating and protruding from the brake housing 80 and the dial holder 140.

Figure 11:
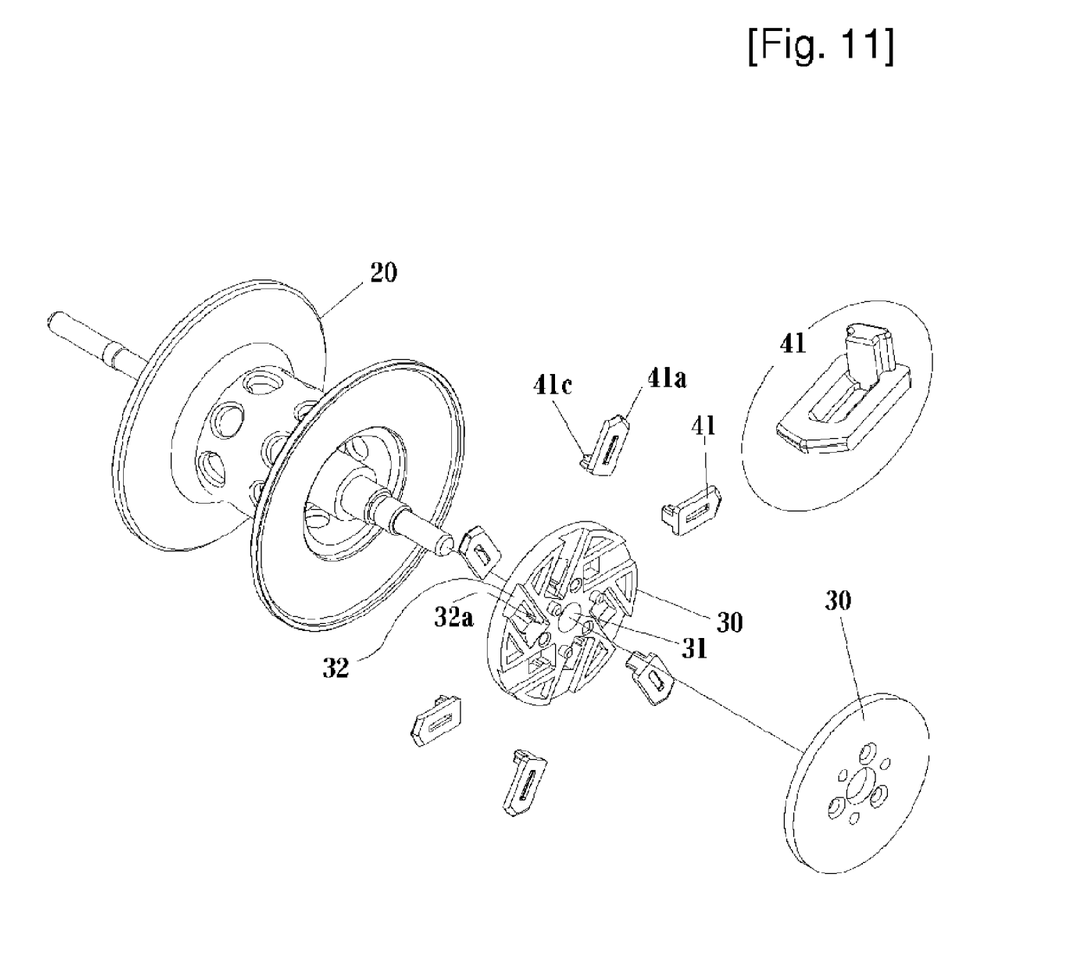
FIG. 11 is an exploded perspective view illustrating a centrifugal brake and a shoe housing of the baitcast reel in FIG. 3.

Also, the shoe housing 30 is formed in a cylindrical shape having a low height, and has a fixing hole 31 formed on the center of the shoe housing, in which the spool shaft 21 penetrates the fixing hole 31 and is coaxially fixed to the shoe housing 30. The three pairs of slide grooves 32, 34, and 36 formed around the fixing hole 31 are concavely formed to the shoe housing 30.

A boss 38 is formed on an inner surface of the shoe housing 30, except for the first, second, and third slide grooves 32, 34, and 36. The guide plate 50 has a through-hole 51 threadedly engaged with the boss 38.

The brake shoe 41 has a contact stepped portion 41a on a front end thereof which frictionally contacts the first, second, and third brake stages 62, 64, and 66 of the brake drum 60. The contact stepped portion 41a is inclined so as to maximize a contact surface with the inner periphery of the brake drum 60.

Each brake shoe 41 slidably contacts the first, second, and third slide grooves 32, 34, and 36. In this case, since a distance from the center axis to each of first, second, and third stops 52a, 54a, and 56a is different, the movable distance of the brake shoes 41 inserted into each of the first, second, and third stops 52a, 54a, and 56a, which will be described hereinafter.

The first, second, and third stops 52a, 54a, and 56a with a different length are formed on the guide plate 50 to stop the boss 41c of the brake shoe 41, so that the brake shoe 41 protrudes from the center axis of rotation at a different distance, i.e., a protruding distance of the brake shoe 41 from the outside of the shoe housing 30 is different. The brake shoe 41 easily contacts each of the first, second, and third brake stages 62, 64, and 66.

More specifically, the first stop 52a formed on the guide plate 52 is farthest away from the center axis. The third stop 56a formed corresponding to the third slide groove 36 is closest to the center axis. The second stop 54a formed corresponding to the second slide groove 34 is provided between the first stop 52a and the third stop 56a.

The first, second, and third brake stages 62, 64, and 66 formed on the inner edge of the brake drum 60 are formed in a step shape, and an inclined surface 60a is formed between the first and second brake stages 62 and 64, and between the second and third brake stages 64 and 66, respectively, as shown in FIG. 5. When the brake drum 60 is axially moved by the brake drum moving portion 70, the brake shoe 41 can be moved from the first brake stage 62 to the second brake stage 64, or from the second brake stage 64 to the third brake 66, by means of the inclined surface 60a.

The brake drum moving portion 70 moves the shoe housing 30 axially, so that the brake shoe 41 is moved among the zero, first, second, and third brake stages 62, 64, and 66.

The guide bosses 91 of the knob 90 penetrate the through-holes 81 of the brake housing 80, and are movably coupled thereto.

The knob 90 protrudes outward from the main cover 15, with it being rotatably engaged to the outside of the brake housing 80. The dial 130 having the cam member 131 for carrying out a camming operation is rotatably supported on the outer periphery of the knob 90 by the main cover 15, so that the following boss 111a of the magnet holder 111 penetrates the brake housing 80 back and forth.

If the user rotates the knob 90 so as to reduce the rotational force of the shoe housing 30, the guide boss 91 having the guide groove 91a, into which the boss 71a of the brake drum moving portion 70 is inserted, is rotated, and the brake drum moving portion 70 is moved back and forth along the spool shaft 21.

Therefore, as the knob 90 is rotated in a clockwise direction with a user's hand, the brake drum 60 is axially moved by the brake drum moving portion 70, so that the brake shoe 41 can be moved from the zero brake stage to the first brake stage, from the first brake stage to the second brake stage 64, or from the second brake stage 64 to the third brake stage 66. Also, as the knob 90 is rotated in a counterclockwise direction, the brake shoe 41 can be moved a direction opposite to the sequence described above.

The knob 90 is installed in the brake housing 80 in such a way that a click mechanism 140 can allow a user to feel rotation of the knob and produce a click sound, when the knob 90 is rotated to the brake housing 80.

The click mechanism 140 includes a receiving groove 93 axially formed on the lower surface of the knob 90, a resilient member 141 accommodated in the receiving groove 93, a plurality of fixing holes 85 radially formed on the outer surface of the brake housing 80 opposite to the receiving groove 93, and a ball 143 or a pin having a rounded head resiliently supported by an end of the resilient member 141. When the knob 90 is rotated, the knob crosses the fixing holes 85, with it being resiliently biased by the resilient member 141, which produces the click sound. Further, the user can feel the rotation of the knob 90, since the rotation of the dial 130 is restricted by the fixing holes 143.

Since the ball 143 is resiliently supported by the resilient member 141, when the knob 90 is selectively rotated to each brake stage in steps, the user feels the rotation of the knob, so that the user can easily perceive the braking position of the knob.

The operation of the baitcast reel constructed as described above will now be described herein.

Figure 9:
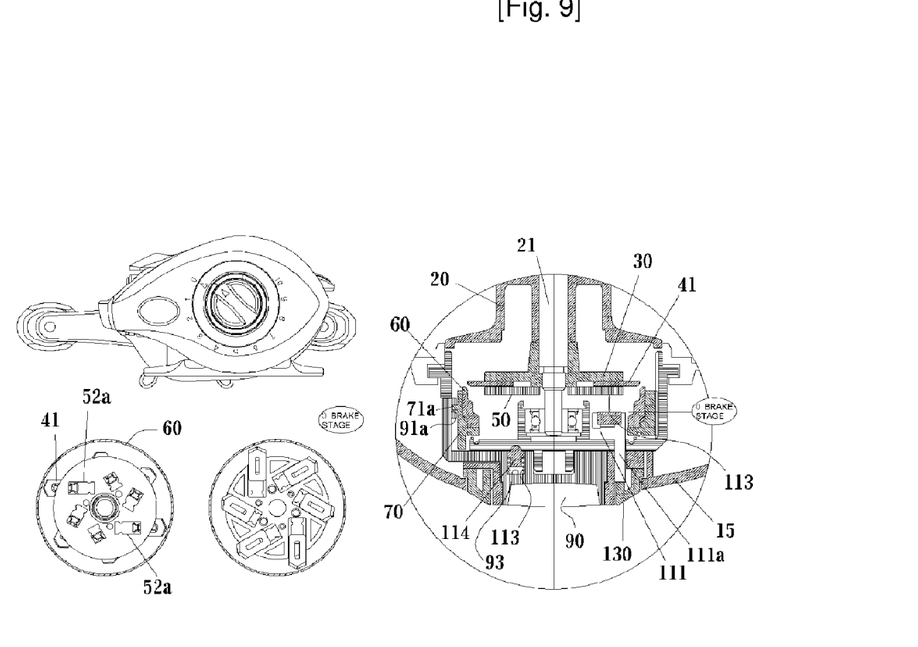
FIG. 9 is a sectional schematic view illustrating the zero braking step in which no brake shoe frictionally contacts a zero brake stage.
Figure 10:
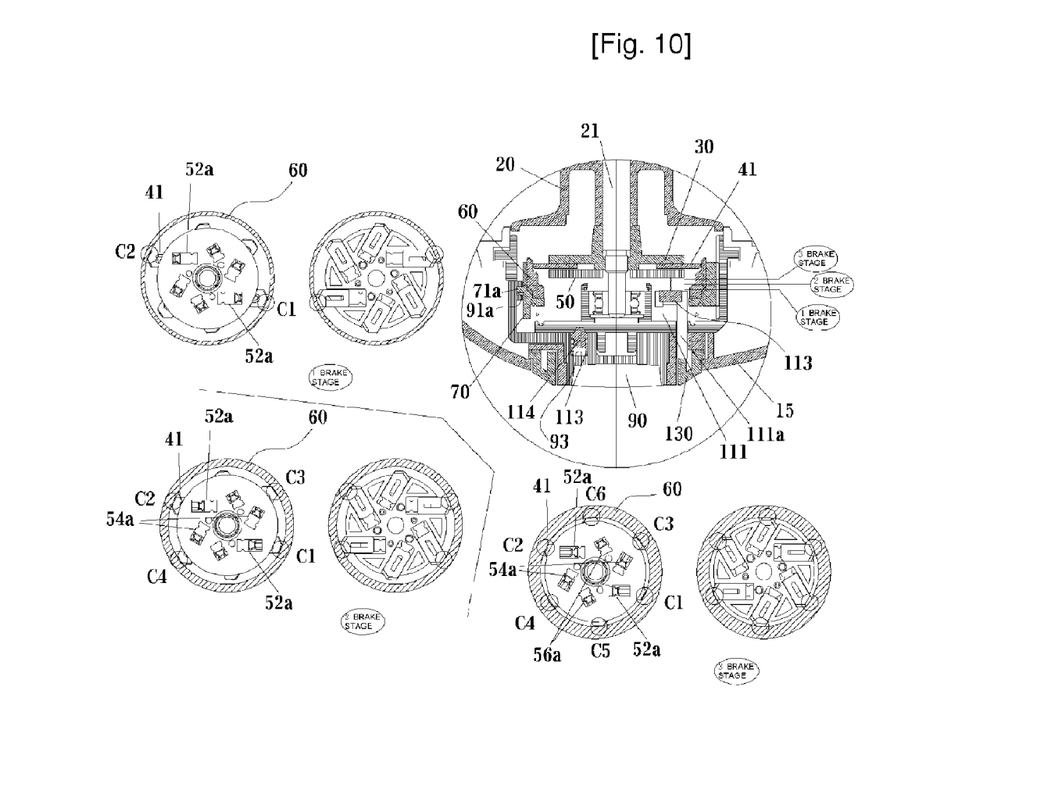
FIG. 10 is a sectional schematic view illustrating several braking steps in which two, four, and six brake shoes frictionally contact a first, second, and third brake stage in sequence.

FIG. 9 is a sectional schematic view illustrating the zero braking step in which no brake shoe frictionally contacts the zero brake stage. FIG. 10 is a sectional schematic view illustrating several braking steps in which two, four, and six brake shoes frictionally contact the first, second, and third brake stage in sequence. FIG. 11 is an exploded perspective view illustrating the centrifugal brake and the shoe housing of the baitcast reel in FIG. 3.

The user rotates the knob 90 to move the brake shoes 41 back and forth along the rotary shaft between the zero brake stage (see FIG. 9) and the first, second, and third brake stages 62, 64, and 66 in FIG. 10. The zero brake stage is an unloaded stage to minimize the braking force of the spool.

For example, if the user rotates the knob 90 from the zero brake stage to the first brake stage, and the brake shoes 41 contact the first brake stage 62 only, the brake drum moving portion 70 and the brake drum 60 are moved toward the spool 20 in one stage. In this case, the shoe housing 30 is moved to a position corresponding to the first brake stage 62, and only the contact stepped portions 41a of two brake shoes 41 engaged to the first stop 52a of the guide plate 50 closely contact the first brake stage 62 and carry out the frictional operation, as shown in FIG. 10 (see reference numerals C1 and C2).

The brake shoes 41 engaged to the second and third stops 54a and 56a are limited to their movable range by the second and third stops 54a and 56a, so that the brake shoes 41 cannot frictionally contact the inner periphery of the brake drum 60.

Next, if the user further rotates the knob 90 in two stages, i.e., rotates the knob 90 from the zero brake stage to the second brake stage, and the brake shoes 41 contact the first and second brake stages 62 and 64 only, the brake drum moving portion 70 and the brake drum 60 are moved toward the spool 20 in two stages. Thus, the brake drum moving portion 70 and the brake drum 60 are slightly moved toward the spool 20 by the spring 75. In this case, the shoe housing 30 is moved to a position corresponding to the second brake stage 64, and the contact stepped portions 41a of four brake shoes 41 engaged to the first slide groove 32 and the second slide groove 34 closely contact the second brake stage 64 and carry out the frictional operation, as shown in FIG. 10 (see reference numerals C1, C2, C3, and C4). However, the brake shoe 41 engaged to the third slide groove 36 is limited to its movable range by the third stop 56a, so that the brake shoe 41 cannot frictionally contact the inner periphery of the brake drum 60.

And, if the user further rotates the knob 90 to position it at the second brake stage, the brake drum moving portion 70 and the brake drum 60 are moved close to the spool 20 by the spring 75. In this case, the shoe housing 30 is moved to a position corresponding to the third brake stage 66, and the contact stepped portions 41a of six brake shoes 41 engaged to the first, second, and third slide grooves 32, 34, and 36 closely contact the third brake stage 66 and carry out the frictional operation, as shown in FIG. 10 (see reference numerals C1, C2, C3, C4, C5, and C6). However, all of the brake shoes 41 frictionally contact the corresponding to third brake stage 66. As shown in FIG. 9, no brake shoe 41 frictionally contacts the inner periphery of the brake drum 60.

Also, the user can select each brake stage while the user feels the rotation of the knob 90 every brake stage through the click mechanism 140.

Explaining the magnetic brake 110 with reference to FIGS. 3 through 11, since the magnet holder 111 having magnets 113 with their magnetic poles alternatively arranged in the brake drum 60 is fixed to the brake housing 80 by means of the spring 113 and screws 114, when the user adjusts the magnetic force, the magnets are moved back and forth by the camming operation of the following boss 111a of the magnet holder 111 and the cam member 131 of the dial 130 to adjust the level of the magnetic force.

The positions of the magnets 113 of the magnet holder 111 are not changed, in which a movable amount of magnets is determined by the cam member 131 of the dial 130, and the backlash is prevented by the variation of the braking force due to the varied distance of the guide plate 50 rotated together with the spool 20.

In the state in which only two brake shoes 41 frictionally contact the first brake stage 62 to adjust the reel in the first brake stage, after a bait and a fishhook having a weight are connected to the end of a fishing line wound around the spool, when a fishing rod with a baitcast reel is swung at a large angle to cast the weight and the bait, with the baitcast reel being gripped by a user's hand, and the weight and the bait are cast to a distance. At that time, the fishing line L is unwound from the spool 20 by the weight, and the spool 20 is rotated at a high speed in a direction indicated by T, as shown in FIG. 6. Thus, the brake shoes 41 slidably coupled to the first slide groove 32 are axially moved toward the center axis. In this case, the contact stepped portion 41a of the brake shoe is released from the first brake stage 62 of the brake drum 60.

If the weight comes in contact with a river-bed or seabed and the casting is completed, the force to forcibly rotate the spool 20 is eliminated, and thus the rotating force of the spool 20 operatively coupled to the spool drive gear mechanism is reduced. At that time, the brake shoes 41 slidably installed in the first slide groove 32 are moved toward the center axis by the inertial force.

Consequently, after the casting of the weight has been completed, any force is not applied to the spool 20, except for the inertial force, and the spool 20 is continuously rotated by the inertial force. Therefore, the rotating force of the spool 20 is attenuated. At that time, since the brake shoes 41 maintains the initial inertial force of the spool 20 as it is, if the rotating speed of the spool 20 is slowed down, the brake shoes 41 are outwardly moved from the first slide groove 32. As a result, as shown in FIG. 10, two contact stepped portions 41a closely contact the first brake stage 62 and carry out the frictional operation, as shown in FIG. 10 (see reference numerals C1 and C2). Thus, the rotating force of the spool 20 is abruptly attenuated, so that the fishing line is further unwounded from the spool 20 to prevent the line backlashing.

Meanwhile, since the casting power is different every user, in case of a user having a strong casting power, the braking force of the spool should be large. To this end, the user rotates the knob 90 to apply the second braking force to the spool. Therefore, the contact stepped portions 41a of four brake shoes 41 closely contact the second brake stage 64 and carry out the frictional operation, as shown in FIG. 10 (see reference numerals C1, C2, C3, and C4). Also, the contact stepped portions 41a of six brake shoes 41 closely contact the third brake stage 66 and carry out the frictional operation, as shown in FIG. 10 (see reference numerals C1, C2, C3, C4, C5, and C6). This is possible by rotating the knob 90.

In order to wind the fishing line around the spool 20, the spool 20 is rotated in a direction indicated by R by rotating the handle 22. If the brake shoes 41 are moved from the first, second, and third slide grooves 32, 34, and 36, and contact the brake drum 60, the contact stepped portions 41a cannot apply frictional resistance to the brake drum 60 by the inclined direction of the first, second, and third slide grooves 32, 34, and 36. Therefore, the spool is not applied by any loads, so that the winding operation is easily achieved.

Meanwhile, a consumer checks out the rotating force of the spool by rotating the handle, while the fishing line is not wounded around the spool. In this case, the spool is rotated in a direction opposite to the casting direction, and the rotating force is decreased by the braking force. According to the present invention, however, the brake shoes are slidably moved from the vicinity of the center of the brake housing to the receiving groove 93, while the brake shoes are biased at a specified angle to a circumferential direction of the brake housing and are radially extended. When the spool is rotated in a direction opposite to the casting direction, the braking force of the spool is minimized, and the rotating force is maximized, thereby increasing a buying power.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

INDUSTRIAL APPLICABILITY

As apparent from the above description, according to the brake mechanism for a baitcast reel according to the present invention, after the casting has been completed, the brake shoes are outwardly moved from the slide grooves by the centrifugal force resulted from the inertia of the brake shoes, and closely contact the brake drum to brake the rotation of the spool, thereby preventing the line backlashing problem.

Also, in case in which a user having different casting power utilizes the reel, the use can increase or decrease the frictional force between the brake drum and the brake shoes by simply rotating the centrifugal brake knob to change the number of the brake shoes contacting the zero, first, second, and third brake stages, thereby effectively braking the spool, without disassembling or assembling the main cover. In order to increase the braking force of the spool, the user selectively rotates the magnetic brake or dial.

When the fishing line is wound around the spool, the brake drum is not applied with the frictional resistance by the contact stepped portion end, so that the spool can carry out the winding operation in a no-load state.

The invention claimed is:

1. A brake mechanism for a baitcast reel including a main cover, a spool having a spool shaft rotatably connected to the reel, and a centrifugal brake, the centrifugal brake comprising:

a shoe housing connected to the spool shaft, rotated together with the spool, and having three pairs of first, second, and third slide grooves radially formed and biased at a specified angle with respect to a center axis thereof;

six brake shoes slidably coupled to the first, second, and third slide grooves of the shoe housing;

a guide plate coupled to the shoe housing for preventing the brake shoe from escaping from the first, second, and third slide grooves;

a brake drum accommodating the shoe housing and the guide plate, and having first, second, and third brake stages of different inner diameters formed on an inner edge and boundary surfaces where the first, second, and third brake stages meet to each other;

a brake drum moving portion coupled to the brake drum having a boss protruding from an outer surface at a slant lead angle;

a brake housing fixed to the main cover, and having an opened side for receiving the brake drum moving portion and a closed side with through-holes;

a spring interposed between the brake drum moving portion and the brake housing; and a knob rotatably coupled to the brake housing, and having guide bosses formed on both sides and penetrating the through-holes to move the brake drum moving portion back and forth.

2. The brake mechanism as claimed in claim 1, further comprising a magnetic brake including a dial positioned coaxially with the knob and being flush with a side of a main cover, and a magnet holder having magnets moved back and forth along a rotating shaft by a cam surface of the dial.

3. The brake mechanism as claimed in claim 2, wherein the magnetic brake includes a magnet holder coaxially arranged flush with the knob in the brake housing and moved together with the guide plate of the shoe housing to change influence of a magnetic force, and a cam member positioned at one side of the magnet holder and contacting a following boss penetrating and protruding from the brake housing and a dial holder.

4. The brake mechanism as claimed in claim 3, wherein the first, second, and third brake stages formed on the inner edge of the brake drum are formed in a step shape, and an inclined surface is formed between the first and second brake stages, and between the second and third brake stages, respectively; and when the brake drum is axially moved by the brake drum moving portion, the brake shoe is moved from the first brake stage to the second brake stage, or from the second brake stage to the third brake, by means of an inclined surface.

5. The brake mechanism as claimed in claim 1, wherein the brake shoe has a contact stepped portion on a front end thereof which frictionally contacts the first, second, and third brake stages of the brake drum, and the contact stepped portion is inclined.

6. The brake mechanism as claimed in claim 1, wherein first, second, and third stops with a different length are formed on the guide plate to stop the boss of the brake shoe, so that the brake shoe protrudes from a center axis of rotation at a different distance, i.e., a protruding distance of the brake shoe from the outside of the shoe housing is different, and the brake shoe easily contacts each of the first, second, and third brake stages.

7. The brake mechanism as claimed in claim 1, wherein the knob is installed in the brake housing in such a way that a click mechanism allows a user to feel rotation of the knob and produce a click sound, when the knob is rotated to the brake housing, the click mechanism including a receiving groove axially formed on a lower surface of the knob, a resilient member accommodated in the receiving groove, a plurality of fixing holes radially formed on an outer surface of the brake housing opposite to the receiving groove, and a ball or a pin having a rounded head resiliently supported by an end of the resilient member, and wherein when the knob is rotated, the knob crosses the fixing holes, with it being resiliently biased by the resilient member, which produces the click sound, and the user feels rotation of the knob, since the rotation of the dial is restricted by the fixing holes.

* * * * *